United States Patent [19]

Schmerling

[11] 3,723,473
[45] Mar. 27, 1973

[54] 9-BENZYL OR 9-HALOBENZYL-PENTA HALO-OCTAHYDRO-5,8-METHANONAPHTHALENE-2,3-DICARBOXYLIC ACID OR ANHYDRIDE

[75] Inventor: Louis Schmerling, Riverside, Ill.

[73] Assignee: Universal Oil Products Company, Des Plaines, Ill.

[22] Filed: Feb. 2, 1970

[21] Appl. No.: 7,998

[52] U.S. Cl. .................... 260/346.6, 252/8.1, 260/2, 260/650 R, 260/651 R
[51] Int. Cl. ............................................. C07c 61/28
[58] Field of Search ............. 260/346.6, 515 R, 346.3

[56] References Cited

UNITED STATES PATENTS 3,359,279   12/1967   Mark ................................ 260/346.6

Primary Examiner—Donald G. Daus
Assistant Examiner—Bernard Dentz
Attorney—James R. Hoatson, Jr. and Raymond H. Nelson

[57] ABSTRACT

Novel compositions of matter comprising polyhalo-substituted arylpolyhydromethanopolycyclic dicarboxylic acids or anhydrides thereof, as exemplified by 5,6,7,8,9-pentachloro-9-benzyl-1,2,3,4,4a,5,8,8a-octahydro-5,8-methano-2,3-naphthalene dicarboxylic acid, are prepared by reacting an aryl derivative of a halogen-substituted cycloalkadiene with an unsaturated dibasic acid or anhydride thereof. These novel compositions of matter are useful as components of finished plastic compounds, the novel compositions of matter imparting flame retardant properties to the finished compound.

4 Claims, No Drawings

9-BENZYL OR 9-HALOBENZYL-PENTA HALO-OCTAHYDRO-5,8-METHANONAPHTHALENE-2,3-DICARBOXYLIC ACID OR ANHYDRIDE

This invention relates to novel compositions of matter comprising polyhalo-substituted aryl-polyhydromethanopolycyclic dicarboxylic acids or anhydrides thereof. More particularly, the invention is concerned with polychloro or polybromo-substituted polyhydroarylmethanopolycyclic dicarboxylic acids or the corresponding anhydrides thereof in which halogen substituents may be on the aryl substituent on the methano carbon atom as well as on the rings of the nucleus, said components possessing desirable physical characteristics of flame retardancy and fire resistance.

Inasmuch as there is an increasing use in the industrial, commercial and residential world of polymers, resins, as well as naturally occurring and synthetic fabrics and textiles, it is becoming increasingly more important that these products possess certain desirable physical characteristics. Among these desirable physical characteristics are those of flame proofing or fire retardancy. These particular physical characteristics will possess special advantages when preparing plastics, polymers, resins, various rubbers, textiles, etc. which will be utilized in various places which may be subjected to excessive heat or to the action of a possible flame, such as places including architectural panels for construction work, wall plugs for electrical connections, soundproofing material in walls, ceilings, etc., cushions for various vehicle seats such as airplane seats, automobile seats, bus seats, etc. In addition, it is also desirable for various paints, lacquers, varnishes, protective coatings, films, etc., to also possess the aforesaid desirable physical characteristics of being fire retardant or flameproof. In order to render these various articles of commerce fire retardant, it is necessary to incorporate therein, as one component thereof, a compound which possesses this characteristic. It is known that compounds which contain chlorine or bromine substituents possess this characteristic and therefore it has been found that the novel composition of matter of the present invention may be utilized as an intermediate in preparing these compounds. Generally speaking, the compounds which possess this desirable physical characteristic must also contain some reactive substituent in order that it may be compounded with the polymer, resin, textile, etc. and, in many instances, become an integral part of the finished product by reacting with the particular polymer, resin, etc. which also possesses a reactive substituent. A specific example of this type of compound which possesses desirable flame retardant characteristics comprises 5,6,7,8,9-pentachloro-9-pentachlorobenzyl-1,2,3,4,4a,5,8,8a-octahydro-5,8-methano-2,3-naphthalenedicarboxylic acid anhydride. This compound is prepared by reacting 5-pentachlorobenzyl-,2,3,4,5-pentachloro-1,3-cyclopentadiene with 1,2,3,6-tetrahydrophthalic anhydride in a Diels-Alder reaction. The aforementioned naphthalene dicarboxylic anhydride containing 10 chlorine substituents will, as hereinbefore set forth, possess an excellent flame retardant property and therefore will be used as a component in formulating polymers, resins, coatings, etc. which, in turn, as finished articles of commerce will be flameproof or highly retardant to fire.

It is therefore an object of this invention to provide novel compositions of matter possessing desirable physical characteristics.

A further object of this invention is to prepare novel compositions of matter containing halogen substituents such as chlorine or bromine which render said compositions of matter useful as intermediates in preparing further compounds which possess desirable physical characteristics of flame-proofing or fire retardancy and which may be used as components in finished articles of commerce which will also possess these desirable physical characteristics.

In one aspect an embodiment of this invention resides in a novel composition of matter comprising a polyhalo-substituted arylpolyhydromethanopolycyclic dicarboxylic acid or corresponding anhydride thereof.

A specific embodiment of this invention is found in a novel composition of matter comprising 5,6,7,8,9,-pentachloro-9-pentachlorobenzyl-1,2,3,4,4a,5,8,8a-octahydro-5,8-methano-2,3-naphthalene dicarboxylic acid anhydride.

Other objects and embodiments will be found in the following further detailed description of the present invention.

As hereinbefore set forth the present invention is concerned with novel compositions of matter comprising polyhalo-substituted arylpolyhydromethanopolycyclic dicarboxylic acids or anhydrides thereof. The term "arylmethano" as used in the present specification and appended claims will refer to aromatic substituents on the methano radical which may, if so desired, be mono or polyhalogenated. The novel compositions of matter of the present invention may be illustrated by the following general formula

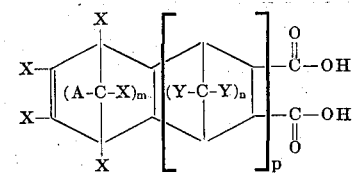

in which X is selected from the group consisting of halogen, and particularly chlorine and/or bromine and hydrogen atoms, at least two of the X's being halogen, Y is selected from the group consisting of hydrogen and halogen atoms, A is an arylalkyl or halogenated derivative of an arylalkyl radical, $m$ is an integer of from 1 to 3, n ranges from 0 to 3 and $p$ ranges from 0 to 4. The above structure illustrates the dicarboxylic acid; however, in the interest of simplicity, the corresponding anhydride is not illustrated, but is readily ascertainable from the above structure.

The aforementioned compounds are prepared by condensing an aryl derivative of a halo-substituted cycloalkadiene with an unsaturated dibasic acid or anhydride thereof. As hereinbefore set forth the aryl portion of the compound may contain halogen substituents. These aryl derivatives of the halo-substituted alkadiene may be prepared by reacting a halo-substituted cycloalkadiene with an alkylaromatic hydrocarbon, the alkyl group of which is primary or secondary, in the presence of a catalyst comprising a free radical generating compound, and thereafter halogenating the resultant compound by utilizing a halogenating agent such as elemental chlorine, elemental bromine, or a chloride or bromide, the amount of halogenating agent utilized in this step of the process being dependent upon the extent of the halogenation desired. Examples of halo-substituted alkadienes which may be reacted with an alkylaromatic hydrocarbon will include 1,2,5-trichloro-1,3-cyclopentadiene, 1,2,3,4-tetrachloro-1,3-cyclopentadiene, 1,2,3,5,5-pentachloro-1,3-cyclopentadiene, hexachloro-1,3-cyclopentadiene, 1,2,5,5-tetrachloro-1,3-cyclohexadiene, 1,2,3,4,5,5-hexachloro-1,3-cyclohexadiene, 1,2,3,4,5,5,6,6-octachloro-1,3-cyclohexadiene, etc. Examples of alkylaromatic hydrocarbons which may undergo reaction with the aforementioned polyhalo-substituted alkadienes will include toluene, o-xylene, m-xylene, p-xylene, ethylbenzene, the isomeric trimethylbenzenes, o-ethyltoluene, m-ethyltoluene, p-ethyltoluene, n-propylbenzene, isopropylbenzene, p-isopropyltoluene, n-butylbenzene, sec-butylbenzene, 1-methylnaphthalene, 2-methylnaphthalene, 1-ethylnaphthalene, 2-ethylnaphthalene, 1-methylanthracene, 2-methylanthracene, 1-methylphenanthrene, 2-ethylphenanthrene, 1-methylchrysene, 2-ethylchrysesn, 1-methylpyrene, methylbiphenyl, ethylbiphenyl, etc. It is also -ethylchyrsene, within the scope of this invention that alkyl-substituted alkylaromatic hydrocarbons which contain both a benzene ring and a saturated ring such as tetralin, indane, cyclohexylbenzene, etc. may also be used, although not necessarily with equivalent results.

The aforementioned alkylaromatic hydrocarbons and the halo-substituted alkadienes are reacted in the presence of a catalyst which is capable of forming free radicals under the reaction conditions. These catalysts will include diazonium compounds, metal alkyls and peroxy compounds, the latter compound being the preferred catalysts for this reaction. Specific examples of such peroxy compounds will include peracetic acid, persuccinic acid, dimethyl peroxide, di-t-butyl peroxide, acetyl peroxide, acetylbenzoyl peroxide, propionyl peroxide, butyryl peroxide, lauryl peroxide, benzoyl peroxide, t-butyl perbenzoate, t-butyl hydroperoxide, cyclohexanone peroxide, cumene hydroperoxide, diisopropyl hydroperoxide, etc. It is to be understood that the aforementioned alkylaromatic hydrocarbons, polyhalo-substituted cycloalkadienes and catalytic compositions of matter are only representative of the class of compounds which may be used to prepare a starting material, and that the present process is not necessarily limited thereto.

The temperature at which the reaction between the aforesaid alkylaromatic hydrocarbons and halogenated cycloalkadienes is effected will be dependent upon the decomposition temperature of the free radical generating compounds. The reaction system temperature must be selected so that the free radical generating compound decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50°C. to about 300°C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus, it is within the skill of one familiar with the art to select the particular temperature needed for any particular catalyst. Generally, the operating temperature does not exceed the temperature at which the half life is not more than 10 hours by more than about 150°C. since free radical generating catalysts decompose radically under such conditions. The half life of tert-butyl perbenzoate is less than 10 hours at about 110°C. and accordingly when this peroxy compound is used as the catalyst for this process, the operating temperature is from about 110°C. to about 300°C., but generally not greater than about 265°C. An operating temperature of from about 130°C. to about 300°C. is used with di-tertbutyl peroxide and from about 75°C. to about 300°C., but generally not greater than about 225°C. with benzoyl peroxide. Little advantage is gained if the temperature is too high even though the reactants tend to become more activated in the presence of the free radical generating catalyst decomposing at a high rate since decomposition of the halo-substituted cycloalkadiene takes place at temperatures above about 300° C.

Although pressures of up to 100 atmospheres may be utilized, the reaction preferably takes place in liquid phase and thus will preferably range from about atmospheric to about 100 atmospheres such that a substantial proportion of the reactants is in the liquid phase. Pressure is not an important variable in the process of this invention. However, because of the low boiling points of some of the reactants it may be necessary to utilize pressure withstanding equipment to insure liquid phase conditions. In batch type operations it is often desirable to utilize pressure withstanding equipment, to charge the reactants and catalyst to the vessel, and to pressure the vessel to 10, or 30, or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with the pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy it is desirable to use low concentrations of the catalyst such as from about 0.1 percent to about 10 percent of the total weight of the halo-substituted cycloalkadiene and alkylaromatic hydrocarbon charged to the process. The reaction time may be within the range of less than 1 minute to several hours, depending upon temperature and half life of the free radical generating catalyst, as set forth hereinabove. Generally, contact times of at least 10 minutes are preferred.

It is also contemplated within the scope of this invention that one of the starting materials, particularly a substituted polybromo cycloalkadiene, which is utilized in the process of this invention to produce the novel compositions of matter may also be produced by alternative methods, it also being contemplated within the scope of this invention that the desired product may be obtained by reacting the halo-substituted cycloalkadiene with the alkylaromatic hydrocarbon at elevated temperature in excess of about 200°C. or by the interaction of a halo-substituted cycloalkadiene with a tri (alkylaryl) phosphite. Thus, 5-benzyl-1,2,3,4,5-pentabromo-1,3-cyclopentadiene is formed by the reaction of hexabromocyclopentadiene with tribenzyl phosphite.

If so desired, the thus prepared aryl derivative of a polyhalo-substituted cycloalkadiene may then undergo halogenation in a conventional manner to prepare haloaryl derivatives of polyhalo-substituted cycloalkadienes, the amount of halogenation, or the number of halogen substituents on the aryl portion of the molecule being dependent upon the ratio of halogenating agent to the aromatic derivative of the halo-substituted cycloalkadiene. The halogenation step of the process, is one is to be effected, will usually occur at ambient temperatures and a pressure ranging from atmospheric up to about 100 atmospheres, and halogenation conditions being dependent upon the particular halogenating agent which is employed to effect the reaction.

Examples of aryl derivatives of polyhalo-substituted cycloalkadienes which are condensed with an unsaturated dibasic acid or anhydride thereof to form the novel compositions of matter of the present invention will include 5-benzyl-1,5-dichloro-1,3-cyclopentadiene, 5-(2,3-dichlorobenzyl)-1,3,5-trichloro-1,3-cyclopentadiene, 5(2,4,6-trichlorobenzyl)-2,3,4-trichloro-1,3-cyclopentadiene, 5-(2,3,5,6-tetrachlorobenzyl)-1,4,5-trichloro-1,3-cyclopentadiene, 5-(pentachlorobenzyl)-1,2,5-trichloro-1,3-cyclopentadiene, 5-benzyl-1,2,3,4,5-pentachloro- 1,3-cyclopentadiene, 5-(2,3-dichlorobenzyl)-1,2,3,4,5-pentachloro-1,3-cyclopentadiene, 5-(2,4,6-trichlorobenzyl)-1,2,3,4,5-pentachloro-1,3-cyclopentadiene, 5-(2,3,5,6-tetrachlorobenzyl)-1,2,3,4,5-pentachloro-1,3-cyclopentadiene, 5-(pentachlorobenzyl)-1,2,3,4,5-pentachloro-1,3-cyclopentadiene, 5-benzyl-1,4,5-tribromo-1,3-cyclopentadiene, 5-(2,6-dibromobenzyl)-1,4,5-tribromo-1,3-cyclopentadiene, 5-(2,4,6-tribromobenzyl)-1,4,5-tribromo-1,3-cyclopentadiene, 5-(2,3,5,6-tetrabromobenzyl)-1,4,5-tribromo-1,3-cyclopentadiene, 5-(pentabromobenzyl)-1,4,5-tribromo-1,3-cyclopentadiene, 5-benzyl-1,2,3,4,5-pentabromo-1,3-cyclopentadiene, 5-(2,3-dibromobenzyl)-1,2,3,4,5-pentabromo-1,3-cyclopentadiene, 5-(2,4,6-tribromobenzyl)-1,2,3,4,5-pentabromo-1,3-cyclopentadiene, 5-(2,3,5,6-tetrabromobenzyl)-1,2,3,4,5-pentabromo-1,3-cyclopentadiene, 5-(pentabromobenzyl)-1,2,3,4,5-pentabromo-1,3-cyclopentadiene, 5-(2,3-dichloronaphthylmethyl)-1,3,5-trichloro-1,3-cyclopentadiene, 5-(2,6-dichloronaphthylmethyl)-1,2,3,4,5-pentachloro-1,3-cyclopentadiene, 5-(4-chloro-2-methylbenzyl)-1,4,5-trichloro-1,3-cyclopentadiene, 5-(2,3,5,6-tetrachloro-4-methylbenzyl)-1,2,3,4,5-pentachloro-1,3-cyclopentadiene, 5-(2,3-dibromonaphthylmethyl)-1,4,5-tribromo-1,3-cyclopentadiene, 5-(2,3-dibromonaphthylmethyl)-1,2,3,4,5-pentabromo-1,3-cyclopentadiene, 5-(2-bromo-4-methylbenzyl)-1,4,5-tribromo-1,3-cyclopentadiene, 5-(2,3,5,6-tetrabromo-4-methylbenzyl)1,2,3,4,5-pentabromo-1,3 -cyclopentadiene, the corresponding aryl and haloaryl derivatives of the chloro and bromo-substituted 1,3-cyclohexadienes, 1,3-cycloheptadienes, etc.

Examples of unsaturated dibasic acids and anhydrides thereof which are condensed with the aforementioned aryl derivatives of polyhalo-substituted cycloalkadienes will include maleic acid, maleic anhydride, fumaric acid, itaconic acid, citraconic acid, glutaconic acid, 1,2,3,6-tetrahydrophthalic acid, 1,2,3,6-tetrahydrophthalic anhydride, bicyclo-[2.2.1]-5-heptene-2,3-dicarboxylic acid, bicyclo-[2.2.1]-5-heptene-2,3-dicarboxylic anhydride, etc. It is to be understood that the aforementioned aryl derivatives of a polyhalo-substituted cycloalkadiene and a dibasic acid or anhydride thereof which contains carbon to carbon unsaturation are only representative of the class of compounds which may be used to prepare the novel compositions of matter, and that the present invention is not necessarily limited thereto.

The novel compositions of matter of the present invention may be prepared in any suitable manner including both batch type and continuous types of operation, said condensation of the two reactants being effected in a Diels-Alder manner. For example, when a batch type operation is used the quantity of the unsaturated dibasic acid or anhydride thereof and the aryl derivative of the polyhalo-substituted cycloalkadiene are placed in an appropriate apparatus along with, if so desired, a substantially inert organic solvent which may comprise an aromatic hydrocarbon such as benzene, toluene, the xylenes, etc.; a paraffinic hydrocarbon such as n-pentane, n-hexane, n-heptane, etc.; a cycloparaffin such as cyclopentane, methylcyclopentane, cyclohexane, etc. Thereafter, the apparatus is heated to the desired operating temperature which may range from about 50°C. to about 250°C. or more. In addition, the condensation conditions may include pressures ranging from atmospheric up to about 100 atmospheres or more, said superatmospheric pressures being supplied by the reaction solvent or by the introduction of an inert gas such as nitrogen into the reaction zone, the amount of pressure at which the reaction is effected being that which is sufficient to maintain a major portion of the reactants in a liquid phase. Upon completion of the desired residence time which may range from 0.5 up to about 10 hours or more in duration, heating is discontinued, the apparatus and contents thereof is allowed to return to room temperature and the excess pressure, if any, is discharged. The reaction mixture is recovered from the apparatus, a particularly preferred apparatus being an autoclave of the rotating or mixing type, and subjected to conventional means of separation and purification whereby the desired product comprising the polyhalo-substituted arylpolyhydromethanopolycyclic dicarboxylic acid or anhydride thereof is recovered.

It is also contemplated within the scope of this invention that the novel compositions of matter may be prepared in a continuous manner of operation. When such a type of operation is to be employed the starting materials comprising the dibasic acid or anhydride thereof which contains carbon to carbon unsaturation and the aryl derivative of the polyhalo-substituted cycloalkadiene are continuously charged to a reaction zone which is maintained at the proper operating conditions of temperature and pressure. If so desired, the starting materials may be charged to the reactor as a solution in an inert solvent of the type hereinbefore set forth in greater detail. Upon completion of the desired residence time the reactor effluent is continuously withdrawn and subjected to conventional separation means such as fractional distillation whereby the unreacted starting materials and solvent are recycled to form a portion of the feed stock while the desired product is recovered.

Some specific examples of the novel compositions of matter which may be prepared according to the process herein set forth and which will possess the generic formula hereinbefore set forth will include 5,6,7,8,9-pentachloro-9-benzyl-1,2,3,4,4a,5,8,8a-octahydro-5,8-methano-2,3-naphthalene dicarboxylic acid, 5,6,7,8,9-pentachloro-9-benzyl-1,2,3,4,4a,5,8,8a-octahydro-5,8-methano-2,3-naphthalene dicarboxylic acid anhydride, 5,6,7,8,9-pentachloro-9-(4-methylbenzyl)-1,2,3,4,4a,5,8,8a-octahydro-5,8-methano-2,3-naphthalene dicarboxylic acid, 5,6,7,8,9-pentachloro-9-(4-methylbenzyl)-1,2,3,4,4a,5,8,8a-octahydro-5,8-methano-2,3-naphthalene dicarboxylic acid anhydride, 5,6,7,8,9-pentachloro-9-(1-naphthyl)methyl-1,2,3,4,4a,5,8,8a-octahydro-5,8-methano-2,3-naphthalene dicarboxylic acid, 5,6,7,8,9-pentachloro-9-(1-naphthyl)methyl-1,2,3,4,4a,5,8,8a-octahydro-5,8-methano-2,3-naphthalene dicarboxylic acid anhydride, 5,6,7,8,9-pentachloro-9-(2-methylbenzyl)-1,2,3,4,4a,5,8,8a-octahydro-5,8-methano-2,3-naphthalene dicarboxylic acid, 5,6,7,8,9-pentachloro-9-(2-methylbenzyl)-1,2,3,4,4a,5,8,8a-octahydro-5,8-methano-2,3-naphthalene dicarboxylic acid anhydride, 5,6,7,8,9-pentachloro-9-(pentachlorobenzyl)-1,2,3,4,4a,5,8,8a-octahydro-5,8-methano-2,3-naphthalene dicarboxylic acid, 5,6,7,8,9-pentachloro-9-(pentachlorobenzyl)-1,2,3,4,4a,5,8,8a-octahydro-5,8-methano-2,3-naphthalene dicarboxylic acid anhydride, 5,6,7,8,9-pentachloro-9-(tetrachloro-4-methylbenzyl)-1,2,3,4,4a,5,8,8a-octahydro-5,8-methano-2,3-naphthalene dicarboxylic acid, 5,6,7,8,9-pentachloro-9-(tetrachloro-4-methylbenzyl)-1,2,3,4,4a,5,8,8a-octahydro-5,8-methano-2,3-naphthalene dicarboxylic acid anhydride, 5,6,7,8,9-pentachloro-9-(2,3-dichloro-1-naphthyl)methyl-1,2,3,4,4a,5,8,8a-octahydro-5,8-methano-2,3-naphthalene dicarboxylic acid, 5,6,7,8,9-pentachloro-9-(2,3-dichloro-1-naphthyl)methyl-1,2,3,4,4a,5,8,8a-octahydro-5,8-methano-2,3-naphthalene dicarboxylic acid anhydride, 1,4,5,6,7-pentachloro-7-benzylbicyclo-[2.2.1]-5-heptene-2,3-dicarboxylic acid, 1,4,5,6,7-pentachloro-7-benzylbicyclo-[2.2.1]-5-heptene-2,3-dicarboxylic acid anhydride, 1,4,5,6,7-pentachloro-7-(2-methylbenzyl)bicyclo-[2.2.1]-5-heptene-2,3-dicarboxylic acid, 1,4,5,6,7-pentachloro-7-(2-methylbenzyl)bicyclo-[2.2.1]-5-heptene-2,3-dicarboxylic acid anhydride, 1,4,5,6,7-pentachloro-7-(4-methylbenzyl)bicyclo-[2.2.1]-5-heptene-2,3-dicarboxylic acid, 1,4,5,6,7-pentachloro-7-(4-methylbenzyl)bicyclo-[2.2.1]-5-heptene-2,3-dicarboxylic acid anhydride, 1,4,5,6,7-pentachloro-7-(pentachlorobenzyl)bicyclo-[2.2.1]-5-heptene-2,3-dicarboxylic acid, 1,4,5,6,7-pentachloro-7-(pentachlorobenzyl)bicyclo-[2.2.1]-5-heptene-2,3-dicarboxylic acid anhydride, 1,4,5,6,7-pentachloro-7-[tetrachloro(4-methylbenzyl)]-bicyclo-[2.2.1]-5-heptene-2,3-dicarboxylic acid, 1,4,5,6,7-pentachloro-7-[tetrachloro(4-methylbenzyl)]-bicyclo-[2.2.1]-5-heptene-2,3-dicarboxylic acid anhydride, 1,4,5,6,7-pentachloro-7-(tetrachloro-1-naphthyl)bicyclo-[2.2.1]-5-heptene-2,3-dicarboxylic acid, 1,4,5,6,7-pentachloro-7-(tetrachloro-1-naphthyl)bicyclo-[2.2.1]-5-heptene-2,3-dicarboxylic acid anhydride, 5,6,7,8,9-pentachloro-9-benzyl-1,2,3,4,4a,5,8,8a-octahydro-1,4,5,8-dimethano-2,3-naphthalene dicarboxylic acid, 5,6,7,8,9-pentachloro-9-benzyl-1,2,3,4,4a,5,8,8a-octahydro-1,4,5,8-dimethano-2,3-naphthalene dicarboxylic acid anhydride, 5,6,7,8,9-pentachloro-9-(pentachlorobenzyl)-1,2,3,4,4a,5,8,8a-octahydro-1,4,5,8-dimethano-2,3-naphthalene dicarboxylic acid, 5,6,7,8,9-pentachloro-9-(pentachlorobenzyl)-1,2,3,4,4a,5,8,8a-octahydro-1,4,5,8-dimethano-2,3-naphthalene dicarboxylic acid anhydride, 5,6,7,8,9-pentabromo-9-benzyl-1,2,3,4,4a,5,8,8a-octahydro-5,8-methano-2,3-naphthalene dicarboxylic acid, 5,6,7,8,9-pentabromo-9-benzyl-1,2,3,4,4a,5,8,8a-octahydro-5,8-methano-2,3-naphthalene dicarboxylic acid anhydride, 5,6,7,8,9-pentabromo-9-(4-methylbenzyl)-1,2,3,4,4a,5,8,8a-octahydro-5,8-methano-2,3-naphthalene dicarboxylic acid, 5,6,7,8,9-pentabromo-9-(4-methylbenzyl)-1,2,3,4,4a,5,8,8a-octahydro-5,8-methano-2,3-naphthalene dicarboxylic acid anhydride, 5,6,7,8,9-pentabromo-9-(methylnaphthylmethyl)-1,2,3,4,4a,5,8,8a-octahydro-5,8-methano-2,3-naphthalene dicarboxylic acid, 5,6,7,8,9-pentabromo-9-(methylnaphthylmethyl)-1,2,3,4,4a,5,8,8a-octahydro-5,8-methano-2,3-naphthalene dicarboxylic acid anhydride, 5,6,7,8,9-pentabromo-9-(2-methylbenzyl)-1,2,3,4,4a,5,8,8a-octahydro-5,8-methano-2,3naphthalene dicarboxylic acid, 5,6,7,8,9-pentabromo-9-(2-methylbenzyl)-1,2,3,4,4a,5,8,8a-octahydro-5,8-methano-2,3-naphthalene dicarboxylic acid anhydride, 5,6,7,8,9-pentabromo-9-(pentabromobenzyl)-1,2,3,4,4a,5,8,8a-octahydro-5,8-methano-2,3-naphthalene dicarboxylic acid, 5,6,7,8,9-pentabromo-9-(pentabromobenzyl)- 1,2,3,4,4a,5,8,8a-octahydro-5,8-methano-2,3-naphthalene dicarboxylic acid anhydride, 5,6,7,8,9-pentabromo-9-2,3,5,6-tetrabromo-(4-methylbenzyl)-1,2,3,4,4a,5,8,8a-octahydro-5,8-methano-2,3-naphthalene dicarboxylic acid, 5,6,7,8,9-pentabromo- 9-2,3,5,6-tetrabromo-(4-methylbenzyl)-1,2,3,4,4a,5,8,8a-octahydro-5,8-methano-2,3-naphthalene dicarboxylic acid anhydride, 5,6,7,8,9-pentabromo-9-(2,3-dichloronaphthylmethyl)-1,2,3,4,4a,5,8,8a-octahydro-5,8-methano-2,3- naphthalene dicarboxylic acid, 5,6,7,8,9-pentabromo-9-(2,3-dichloronaphthylmethyl)-1,2,3,4,4a,5,8,8a-octahydro-5,8-methano-2,3-naphthalene dicarboxylic acid anhydride, 1,4,5,6,7-pentabromo-7-benzylbicyclo-[2.2.1]-5-heptene-2,3-dicarboxylic acid, 1,4,5,6,7-pentabromo-7-benzylbicyclo-[2.2.1]-5-heptene-2,3-dicarboxylic acid anhydride, 1,3,5,6,7-pentabromo-7-(4-methylbenzyl)bicyclo-[2.2.1]-5-heptene-2,3-dicarboxylic acid, 1,3,5,6,7-pentabromo-7-(4-methylbenzyl)bicyclo-[2.2.1]-5-heptene-2,3-dicarboxylic acid anhydride, 1,4,5,6,7-pentabromo-7-(2-methylbenzyl)bicyclo-[2.2.1]-5-heptene-2,3-dicarboxylic acid, 1,4,5,6,7-pentabromo-7-(2-methylbenzyl)bicyclo-[2.2.1]-5-heptene-2,3-dicarboxylic acid anhydride, 1,4,5,6,7-pentabromo-7-(pentrabromobenzyl)bicyclo-[2.2.1]-5-heptene-2,3-dicarboxylic acid, 1,4,5,6,7-pentabromo-7-(pentabromobenzyl)bicyclo-[2.2.1]-5-heptene-2,3-dicarboxylic acid anhydride, 1,4,5,6,7-pentabromo-7-(2,3,5,6-tetrabromoxylylene)bicyclo-[2.2.1]-5-heptene-2,3-dicarboxylic acid, 1,4,5,6,7-pentabromo-7-(2,3,5,6-tetrabromo-4-methylbenzyl)bicyclo-[2.2.1]-5-heptene-2,3-dicarboxylic acid anhydride, 1,4,5,6,7-pentabromo-7-(3,4,5,6-tetrabromo-2-methylbenzyl)bicyclo-[2.2.1]-5-heptene-2,3-dicarboxylic acid, 1,4,5,6,7-pentabromo-7-(3,4,5,6-tetrabromo-2-methylbenzyl)bicyclo-[2.2.1]-5-heptene-2,3-dicarboxylic acid anhydride, 5,6,7,8,9-pentabromo-9-benzyl-1,2,3,4,4a,5,8,8a-octahydro-1,4,5,8-dimethano-2,3-naphthalene dicarboxylic acid, 5,6,7,8,9-pentabromo-9-benzyl-1,2,3,4,4a,5,8,8a-octahydro-1,4,5,8-dimethano-2,3-naphthalene dicarboxylic acid anhydride, 5,6,7,8,9-pentabromo-9-(pentabromobenzyl)-1,2,3,4,4a,5,8,8a-octahydro-1,4,5,8-dimethano-2,3-naphthalene dicarboxylic acid, 5,6,7,8,9-pentabromo-9-(pentabromobenzyl)-1,2,3,4,4a,5,8,8a-octahydro-1,4,5,8-dimethano-2,3-naphthalene dicarboxylic acid anhydride, etc. While the above-mentioned specific examples set forth are compounds containing the maximum number of chlorine and bromine atoms in the non-aromatic nucleus, it is also contemplated within the scope of this invention that compounds which do not contain the maximum number of chlorine or bromine atoms in this nucleus as well as compounds which contain dissimilar halogen atoms are to be included within the scope of this invention.

The aforementioned novel compositions of matter may be admixed with a polymeric compound to form a finished product whereby desirable physical characteristics such as flame retardancy or flameproofing are added thereto. Some illustrative examples of these polymeric compounds will include plastics, polymers, copolymers, terpolymers, resins, naturally occurring textiles or fabrics such as cotton, wool, linen, etc., naturally occurring and synthetic rubber, leather, synthetic fibers known in the trade as Nylon, Dacron, Rayon, etc. Examples of polymers and copolymers will include an acrylonitrile-butadiene-styrene formulation (commonly known as ABS); foams such as polyurethane formulations, polyesters such as those prepared from ethylene glycol and maleic or phthalic anhydride or terephthalic acid, polyolefins such as polyethylene, polypropylene, polybutylene, polyisoprene, polystyrene, ethylene-propylene etc.; polyphenyl ethers such as polyphenylene oxide, which may or may not have been modified with styrene, acrylate and methacrylate polymers and copolymers, polyamides, polyoxymethylenes, polyalkylene oxides such as polyethylene oxide, polypropylene oxide, allyl resins and furan resins, phenolic resins, various cellulose derivatives such as the acetate-butyrate nitrile cellulose as well as cellulose propionate derivatives, etc.; epoxy resins, etc. These various polymeric compounds are only representative of the class of compounds which may be admixed with the aforementioned polyhalo-substituted arylpolyhydromethanopolycyclic dicarboxylic acids or anhydrides thereof, and it is to be understood that the present invention is not necessarily limited thereto. The aforementioned acid or anhydride will be present in the finished compositions of matter in an amount ranging from about 5 to about 50 percent by weight thereof. The formulation of the final composition of matter may be effected in any suitable manner depending upon the physical state of the reactants or components of the mixture. For example, when the components of the mixture are in a solid state they may be physically admixed in a mixer, by milling the components or by extruding the components through a suitable apparatus after admixture etc., the only criterion which must be made in forming the final composition of matter is that the two components are so thoroughly admixed in such a manner as to impart a uniform degree of contact throughout the entire final composition of matter, said uniform distribution of the flame retardant compound resulting in a uniform degree of flame retardancy or fireproofing throughout the entire composition of matter. In the case of polyesters, the polyhalo-substituted arylpolyhydromethanopolycyclic dicarboxylic acid or anhydride may be admixed with the acid or anhydride which is then used to prepare the polyester.

Some representative examples of the final compositions of matter or compounds which may be prepared will include polyethylene and 5,6,7,8,9-pentachloro-9-pentachlorobenzyl-1,2,3,4,4a,5,8,8a-octahydro-5,8-methano-2,3-naphthalene dicarboxylic acid anhydride, polypropylene and 5,6,7,8,9-pentachloro-9-(pentachlorobenzyl)-1,2,3,4,4a,5,8,8a-octahydro-5,8-methano-2,3-naphthalene dicarboxylic acid anhydride, ABS and 5,6,7,8,9-pentachloro-(9-pentachlorobenzyl)-1,2,3,4,4a,5,8,8a-octahydro-5,8-methano-2,3-naphthalene dicarboxylic acid anhydride, polyisoprene and 5,6,7,8,9-pentachloro-9-(pentachlorobenzyl)-1,2,3,4,4a,5,8,8a-octahydro-5,8-methano-2,3-naphthalene dicarboxylic acid anhydride, epoxy resin and 5,6,7,8,9-pentachloro-9-(pentachlorobenzyl)-1,2,3,4,4a,5,8,8a-octahydro-5,8-methano-2,3-naphthalene dicarboxylic acid anhydride, polyethylene oxide and 5,6,7,8,9-pentachloro-9-(pentachlorobenzyl-1,2,3,4,4a,5,8,8a-octahydro-5,8-methano-2,3-naphthalene dicarboxylic acid anhydride, a polyester incorporating 5,6,7,8,9-pentachloro-9-(pentachlorobenzyl)-1,2,3,4,4a,5,8,8a-octahydro-5,8-methano-2,3-naphthalene dicarboxylic acid anhydride, polyethylene and 1,4,5,6,7-pentachloro-7-(pentachlorobenzylbicyclo[2.2.1]-5-heptene-2,3-dicarboxylic acid, polypropylene and 1,4,5,6,7-pentachloro-7-(pentachlorobenzylbicyclo)-[2.2.1]-5-heptene-2,3-dicarboxylic acid, ABS and 1,4,5,6,7-pentachloro-7-(pentachlorobenzylbicyclo)-[2.2.1]-5-heptene-2,3- dicarboxylic acid, polyisoprene and 1,4,5,6,7-pentachloro- 7-(pentachlorobenzylbicyclo)-[2.2.1]-5-heptene-2,3-dicarboxylic acid, epoxy resin and 1,4,5,6,7-pentachloro-7-(pentachlorobenzylbicyclo)-[2.2.1]-5-heptene-2,3-dicarboxylic acid, polyethylene oxide and 1,4,5,6,7-pentachloro-7-(pentachlorobenzylbicyclo)-[2.2.1]-5-heptene-2,3-dicarboxylic acid, a polyester incorporating 1,4,5,6,7-pentachloro-7-(pentachlorobenzylbicyclo)-[2.2.1]-5-heptene-2,3-dicarboxylic acid, polyethylene and 5,6,7,8,9-pentabromo-9-(pentabromobenzyl)-1,2,3,4,4a,5,8,8a-octahydro-5,8-methano-2,3-naphthalene dicarboxylic acid, ABS and 5,6,7,8,9-pentabromo-9-(pentabromobenzyl)-1,2,3,4,4a,5,8,8a-octahydro-5,8-methano-2,3-naphthalene dicarboxylic acid, epoxy resin and 5,6,7,8,9-pentabromo-9-(pentabromobenzyl)-1,2,3,4,4a,5,8,8a-octahydro-5,8-methano-2,3-naphthalene dicarboxylic acid, a polyester incorporating 5,6,7,8,9-pentabromo-9-(pentabromobenzyl)-1,2,3,4,4a,5,8,8a-octahydro-5,8-methano-2,3-naphthalene dicarboxylic acid, polypropylene and 5,6,7,8,9-pentabromo-9-(pentabromobenzyl)-1,2,3,4,4a,5,8,8a-octahydro-5,8methano-2,3-naphthalene dicarboxylic acid, polyisoprene and 5,6,7,8,9-pentabromo-(9-pentabromobenzyl)-1,2,3,4,4a,5,8,8a-octahydro-5,8-methano-2,3-naphthalene dicarboxylic acid, polyethylene oxide and 5,6,7,8,9-pentabromo-9-(pentabromobenzyl)-1,2,3,4,4a,5,8,8a-octahydro-5,8-methano-2,3-naphthalene dicarboxylic acid, polypropylene and 1,4,5,6,7-pentabromo-7-(pentabromobicyclo)-[2.2.1]-5-heptene-2,3-dicarboxylic acid anhydride, polyisoprene and 1,4,5,6,7-pentabromo-7-(pentabromobicyclo)-[2.2.1]-5-heptene-2,3-dicarboxylic acid anhydride, polyethylene oxide and 1,4,5,6,7-pentabromo-7 -(pentabromobicyclo)-[2.2.1]-5-heptene-2,3-dicarboxylic acid anhydride, polyethylene and 1,4,5,6,7-pentabromo-7-(pentabromobicyclo)-[2.2.1]-5-heptene-2,3-dicarboxylic acid anhydride, ABS and 1,4,5,6,7-pentabromo-7-(pentabromobicyclo)-[2.2.1]-5-heptene-2,3-dicarboxylic acid anhydride, epoxy resin and 1,4,5,6,7-pentabromo-7-(pentabromobicyclo)-[2.2.1]-5-heptene-2,3-dicarboxylic acid anhydride, a polyester and 1,4,5,6,7-pentabromo-7-(pentabromobicyclo)-[2.2.1]-5-heptene-2,3-dicarboxylic acid anhydride, etc.

The aforementioned admixture of compounds which also constitute novel compositions of matter will exhibit an unexpectedly high degree of fire retardancy when compared to polymeric compounds which do not possess all of the components of the desired finished product, these aforementioned finished products being only representative of the class of compounds of the present invention; and, therefore, this invention is not necessarily limited to these compounds.

The following examples are given to illustrate the process of the present invention which, however, are not intended to limit the generally broad scope of the present invention in strict accordance therewith.

EXAMPLE I

In this example 154.8 (0.5 mole) of 1,2,3,4,5-pentachloro-5-benzyl-1,3-cyclopentadiene which is prepared by reacting toluene with hexachlorocyclopentadiene in the presence of a benzoyl peroxide catalyst is placed in a reaction flask along with 200 cc. of a xylene solvent. Following this 85 g. (0.5 mole) of 1,2,3,6-tetrahydrophthalic acid is added and the reaction mixture is heated to a temperature of 140°C. The mixture is maintained at this temperature for a period of 6 hours after which time heating is discontinued and the reaction mixture allowed to return to room temperature. The mixture is recovered and subjected to fractional distillation under reduced pressure whereby the desired product comprising 5,6,7,8,9-pentachloro-9-benzyl-1,2,3,4,4a,5,8,8a-octahydro-5,8-methano-2,3-naphthalene dicarboxylic acid is separated out and recovered.

EXAMPLE II

To an alkylation flask provided with heating and stirring means is added 243.5 g. (0.5 mole) of 1,2,3,4,5-pentachloro-5-(pentachlorobenzyl)-1,3-cyclopentadiene which is prepared by reacting an excess of toluene with hexachlorocyclopentadiene in the presence of a benzoyl peroxide catalyst and thereafter chlorinating the resultant compound with chlorine gas in the presence of antimony pentachloride catalyst. Following this 76 g. (0.5 mole) of 1,2,3,6-tetrahydraphthalic anhydride and 200 cc. of toluene are added and the flask is heated to a temperature of 150°C. with constant stirring. At the end of the 6 hour residence time heating is discontinued and the flask allowed to return to room temperature. The reaction mixture is recovered and subjected to separation means whereby the desired product comprising 5,6,7,8,9-pentachloro-5-(pentachlorobenzyl)-1,2,3,4,4a,5,8,8a-octahydro-5,8-methano-2,3-naphthalene dicarboxylic acid anhydride is recovered.

EXAMPLE III

In a manner similar to that hereinbefore set forth 243.5 g. (0.5 mole) of 1,2,3,4,5-pentachloro-5-pentachlorobenzyl-1,3-cyclopentadiene, 200cc. of toluene and 58 g. (0.5 mole) of maleic acid is condensed at a temperature of 120°C. for a period of 6 hours. At the end of this time, after cooling of the flask and contents, the reaction mixture is recovered and subjected to conventional means of separation whereby the desired product comprising 1,4,5,6,7-pentachloro-7-(pentachlorobenzyl)bicyclo-[2.2.1]-5-heptene-2,3-dicarboxylic acid is recovered.

EXAMPLE IV

In this example a polybrominated compound comprising 1,2,3,4,5-pentabromo-5-benzyl-1,3-cyclopentadiene which is prepared by reacting hexabromocyclopentadiene with tribenzyl phosphite is utilized as the starting material. To a reaction flask provided with heating, stirring and reflux means is added 133 g. (0.25 mole) of the pentabromocyclopentadiene containing the benzyl substituent, 200 cc. of xylene and 38 g. (0.25 mole) of 1,2,3,6-tetrahydraphthalic anhydride. The flask is heated to a temperature of 120°C. and maintained thereat for a period of 6 hours at the end of which time heating is discontinued. The reaction mixture is recovered and subjected to conventional means of separation whereby the desired product comprising 5,6,7,8,9-pentabromo-9-benzyl-1,2,3,4,4a,5,8,8a-octahydro-5,8-methano-2,3-naphthalene dicarboxylic acid anhydride is recovered.

EXAMPLE V

In this example 133 g. (0.25 mole) of 1,2,3,4,5-pentabromo-5-benzyl-1,3-cyclopentadiene is treated in a manner similar to that set forth in example IV above with 24.5 g. (0.25 mole) of maleic anhydride, the desired product comprising 1,4,5,6-petrabromo- 7 - benzylbicyclo-[2.2.1]-5-heptene-2,3-dicarboxylic acid anhydride being separated out and recovered.

EXAMPLE VI

A novel compound is prepared by admixing a commercial polypropylene with a sufficient amount of 5,6,7,8,9-pentachloro-9-benzyl-1,2,3,4,4a,5,8,8,a-octahydro-5,8-methano-2,3-naphthalene dicarboxylic acid so that the final compound contains 15 percent by weight of the acid. The resultant mixture is formed into a strip containing a glass cloth in the middle to prevent dripping during the flammability test. In addition, another strip containing only the commercial polypropylene is prepared, this strip also containing a glass cloth. The two strips are then burned in an apparatus similar to the one described by C. P. Fennimore and J. F. Martin in the November, 1966 issue of Modern Plastics. The strip containing only the commercial polypropylene will have an oxygen index (the lowest mole fraction of oxygen sufficient to maintain combustion) of $n = 0.181$. In contrast to this, the oxygen index of the strip which contains the 5,6,7,8,9-pentachloro-9-benzyl-1,2,3,4,4a,5,8,8a-octahydro-5,8-methano-2,3-naphthalene dicarboxylic acid will have an oxygen index much in excess of this number.

EXAMPLE VII

A sufficient amount of 5,6,7,8,9-pentachloro-9-pentachlorobenzyl-1,2,3,4,4a,5,8,8a-octahydro-5,8-methano-2,3-naphthalene dicarboxylic acid anhydride is admixed with a commercial polyester prepared from dimethyl terephthalate and ethylene glycol so that the finished product contains 15 percent of the acid anhydride. This compound is then formed into a strip similar in nature to that set forth in example VI above. In addition, a second strip is also prepared similar in configuration but containing only commercial polyester. The two strips are then subjected to a flammability test similar in nature to that referred to in example VI above. It will be found that the oxygen index of the strip containing the admixture of the anhydride and polyethylene will be greatly in excess over the oxygen index of the strip which contains only polyethylene. In addition, the rate of burning of the treated polyester will be much slower than that of the untreated polyester.

EXAMPLE VIII

In this example a commercial polyethylene oxide is admixed with 5,6,7,8,9-pentachloro-9-(2,4,6-tribromobenzyl)-1,2,3,4,4a,5,8,8a-octahydro-5,8 methano-2,3-naphthalene dicarboxylic anhydride in such proportion so that the finished material contains 15 percent of the acid anhydride. This compound is then milled and then cut into strips similar in nature to the polypropylene strips of example VI. In addition, a second strip is prepared by milling only the commercial polyethylene oxide and cutting the milled polymer into said strips. The treated and untreated strips are subjected to a flammability test where it will be found that the oxygen index of the untreated polyethylene oxide is 0.150, while the oxygen index of the compound of the present invention will be substantially in excess of this number and, in addition, will possess a much slower burning rate than that of the untreated polyethylene oxide.

EXAMPLE IX

A commercial acrylonitrile-butadiene-styrene formulation commercially referred to as ABS is extruded with a sufficient amount of 1,4,5,6,7-pentachloro-7-(pentachlorobenzyl)bicyclo-[2.2.1]-5-heptene-2,3-dicarboxylic acid so that the finished compound contains 15 percent of the weight. The mixture was then extruded as rods having a diameter of 0.5 cm. In addition, another rod was extruded, having a similar diameter, which contains only the ABS formulation. The two rods are burned in an apparatus similar to that referred to in example VI above. It will be found that the oxygen index of the rod which contains only the commercial ABS has an oxygen index of $n = 0.183$ while, in contrast to this, the oxygen index of the ABS rod which contains the acid will be greatly in excess of this number.

EXAMPLE X

A mixture is prepared from polymethylmethacrylate by admixing sufficient amounts of the polymer and 1,4,5,6,7-pentabromo-7-benzylbicyclo-[2.2.1]-5-heptene-2,3-dicarboxylic acid anhydride so that the finished product contains 15 percent of the acid anhydride. The resulting compound is then extruded as rods having a diameter of 0.5 cm. In addition, other rods are extruded which contain only polymethylmethacrylate. The rods are then subjected to a flammability test similar in nature to those referred to in the preceding examples. It will be found that the rod which contains only the polymethylmethacrylate has an oxygen index of 0.173 while the compound containing the polymethylmethacrylate and the 1,4,5,6,7-pentabromo-7-benzylbicyclo-[2.2.1]-5-heptene-5,8-methano-2,3-naphthalene dicarboxylic acid anhydride will possess an oxygen index greatly in excess of this number.

I claim as my invention:
1. 9-benzyl or 9-halobenzyl -5,6,7,8,9-pentahalo-1,2,3,4,4a,5,8,8a-octahydro-5,8-methanonaphthalene-2,3-dicarboxylic acid or anhydride thereof, the halogens being chlorine or bromine.
2. The compound as set forth in claim 1 being 5,6,7,8,9-pentachloro-9-(2,3,4,5,6-pentachlorobenzyl)-1,2,3,4,4a,5,8,8a-octahydro-5,8-methano-2,3-naphthalene dicarboxylic acid anhydride.
3. The compound as set forth in claim 1 being 5,6,7,8,9-pentachloro-9-benzyl-1,2,3,4,4a,5,8,8a-octahydro-5,8-methano-2,3-naphthalene dicarboxylic acid.
4. The compound as set forth in claim 1 being 5,6,7,8,9-pentabromo-9-benzyl-1,2,3,4,4a,5,8,8a-octahydro-5,8-methano-2,3-naphthalene dicarboxylic acid anhydride.

\* \* \* \* \*